United States Patent [19]

Schneider

[11] 4,085,444

[45] Apr. 18, 1978

[54] RANDOM ACTION EVENT SWITCHING METHOD AND APPARATUS FOR A MULTIPLE INPUT DATA PROCESSING SYSTEM

[75] Inventor: Josef F. Schneider, Albuquerque, N. Mex.

[73] Assignee: The United States of America as represented by the Secretary of the Air Force, Washington, D.C.

[21] Appl. No.: 679,253

[22] Filed: Apr. 21, 1976

[51] Int. Cl.² .................... G06F 7/00; G06F 3/00; G11B 13/00
[52] U.S. Cl. .................................................. 364/900
[58] Field of Search ............... 340/172.5, 15.5 DP; 364/200, 900

[56] References Cited

U.S. PATENT DOCUMENTS

| 3,344,406 | 9/1967 | Vinal | 340/172.5 |
| 3,345,616 | 10/1967 | Avril | 340/172.5 |
| 3,439,342 | 4/1969 | Barton | 340/172.5 |
| 3,582,901 | 6/1971 | Cochrane | 340/172.5 |
| 3,629,855 | 12/1971 | Conley | 340/172.5 |
| 3,678,468 | 7/1972 | Jefferson | 340/172.5 |
| 3,787,814 | 1/1974 | Pages | 340/172.5 |

Primary Examiner—James D. Thomas
Attorney, Agent, or Firm—Joseph E. Rusz; Willard R. Matthews, Jr.

[57] ABSTRACT

The acceptance of all events and the processing of such events without lock-out in a multiple input data processing system is achieved by a random action event switching technique. Processing of all events in order of arrival is accomplished by providing an input line for each system input on which the priority of the received event is registered with the resolution of the switch timing clock. Events arriving on other lines during the same time resolution element are processed with equal priority but with identity preserved. At the end of each time interval accumulated events are switched to one of a multiplicity of event holding lines, there being fewer event holding lines than input lines, and the input lines are cleared to receive subsequently arriving events. Event holding lines are filled in selected sequence and are switched to the data system main processor for read-out according to the priority of arrival of the events they hold and in response to main processor availability signals.

5 Claims, 5 Drawing Figures

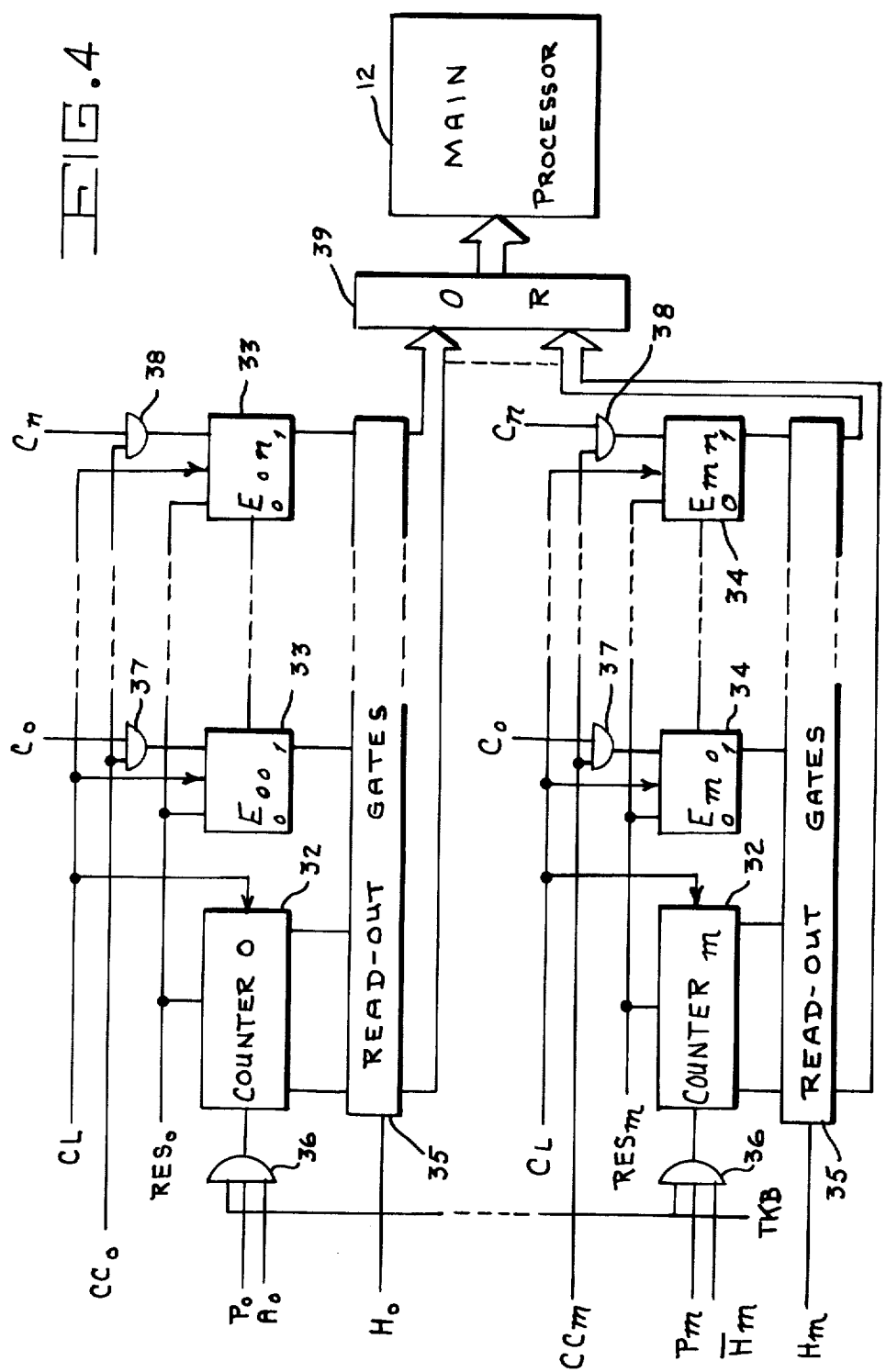

RANDOM ACTION EVENT SWITCHING METHOD AND APPARATUS FOR A MULTIPLE INPUT DATA PROCESSING SYSTEM

STATEMENT OF GOVERNMENT INTEREST

The invention described herein may be manufactured and used by or for the Government for governmental purposes without the payment of any royalty thereon.

BACKGROUND OF THE INVENTION

This invention relates to multiple input data processing systems, and in particular to means for insuring that all events received by such a system are processed in order of their time of arrival.

In guidance systems, events are generated by accelerometers, usually signifying the passing of a delta-velocity increment ($\Delta V$) in each of three coordinates (X, Y, Z) for forward and reverse direction (+, −). Similar events are generated by torquing commands. In order to assure that the measurement system is functioning correctly, a positive and a negative event, alternating at precisely 500 milliseconds is provided as a reference. This adds up to fourteen events that have to be measured.

The processing of an event, i.e., reading the time of occurrence from a precision clock, registering the identity, and eventually recording the information on digital tape tape for further computer use, takes a certain amount of time. With a single processing line no other event can be accepted during this time (lock-out time).

Transmission noise not only affects the proper occurrence of an event, it also creates entirely new events that are in no way related to the intended signal. Even though there is a limit in the system of how close the events on a line can follow each other, a noise spike might occur just ahead of a legitimate event and will lock it out. Unless the legitimate event can also be accepted, noise that close would have to be interpreted as the desired event.

Even with a system that employs multiple processing lines, e.g., one for each input, there still is a lock-out for each individual line and the noise problem is not solved. Because the occurrence of events is random as far as the processing system is concerned, i.e., no particular input line can be given priority, the sequence of arrivals has to be maintained for processing. This is not possible with fixed scan programs or software priority interrupt schemes and therefore the lock-out time for an individual input may be multiplied by the number of later arrivals processed ahead of it.

The present invention is directed toward overcoming the limitations of prior art systems in these regards by means of random action event switching techniques that are especially designed to solve the problem of measuring the occurrences of several simultaneous and near-simultaneous events.

SUMMARY OF THE INVENTION

The invention comprehends the technique of collecting the incoming events of a multi-input data processing system with the resolution of the switching timing clock and according to their identities and priority of arrival, switching events collected during each time period to a selected one of a plurality of event holding lines; and reading-out the event holding lines by the system main processor in accordance with the time of arrival priorities of the events they hold. For the purpose of holding for measurement the times of occurrences and the identities of simultaneous and near-simultaneous events, there is utilized an automatic, electronic, hardware controlled device that accepts and recognizes events from several of $n$ input lines and switches them into one of $m$ holding lines ($m < n$) within the resolution unit of a time clock. Switching preserves the instant and priority of occurrence, and the identity of the event. No event is lost due to switching or lock-out. New events can be accepted even on the same line with the next time clock.

Switching action is triggered by the events themselves, rather than by any programmed scan or search operation. Any one of the $n$ inputs can be switched into any one of the $m$ holding lines. The switch controls which holding line will be committed next. It also assures that the holding line with the oldest (in terms of arrival) information will be processed first.

The ratio of holding lines to input lines is determined by the probabilities of occurrence of events (including noise) of the system to be measured.

It is a principal object of the invention to provide new and improved method and means for measuring the occurrences of several simultaneous and near-simultaneous events in a multiple input data processing system.

It is another object of the invention to provide new and improved means for eliminating lock-out in multiple input data processing systems.

It is another object of the invention to provide a random action event switch in which switching operation is effected by received data (events) rather than by a programmed scan.

It is another object of the invention to provide a random action event switch in which the number of event holding lines is substantially less than the number of input lines.

It is another object of the invention to provide a random action event switch in which simultaneously arriving events require only one holding line.

It is another object of the invention to provide a random action event switch in which the sequence of read-out of the event holding lines by the main processor is the same as the sequence of arrival regardless of the physical connection of the inputs.

These, together with other objects, features and advantages of the invention will become more readily apparent from the following detailed description when taken in conjunction with the illustrative embodiment in the accompanying drawings.

DESCRIPTION OF THE DRAWINGS

FIG. 4 is a schematic diagram of the holding lines and priority switch of the random action event switch of FIG. 1.

DETAILED DESCRIPTION OF THE PREFERRED EMBODIMENT

Figure 1:
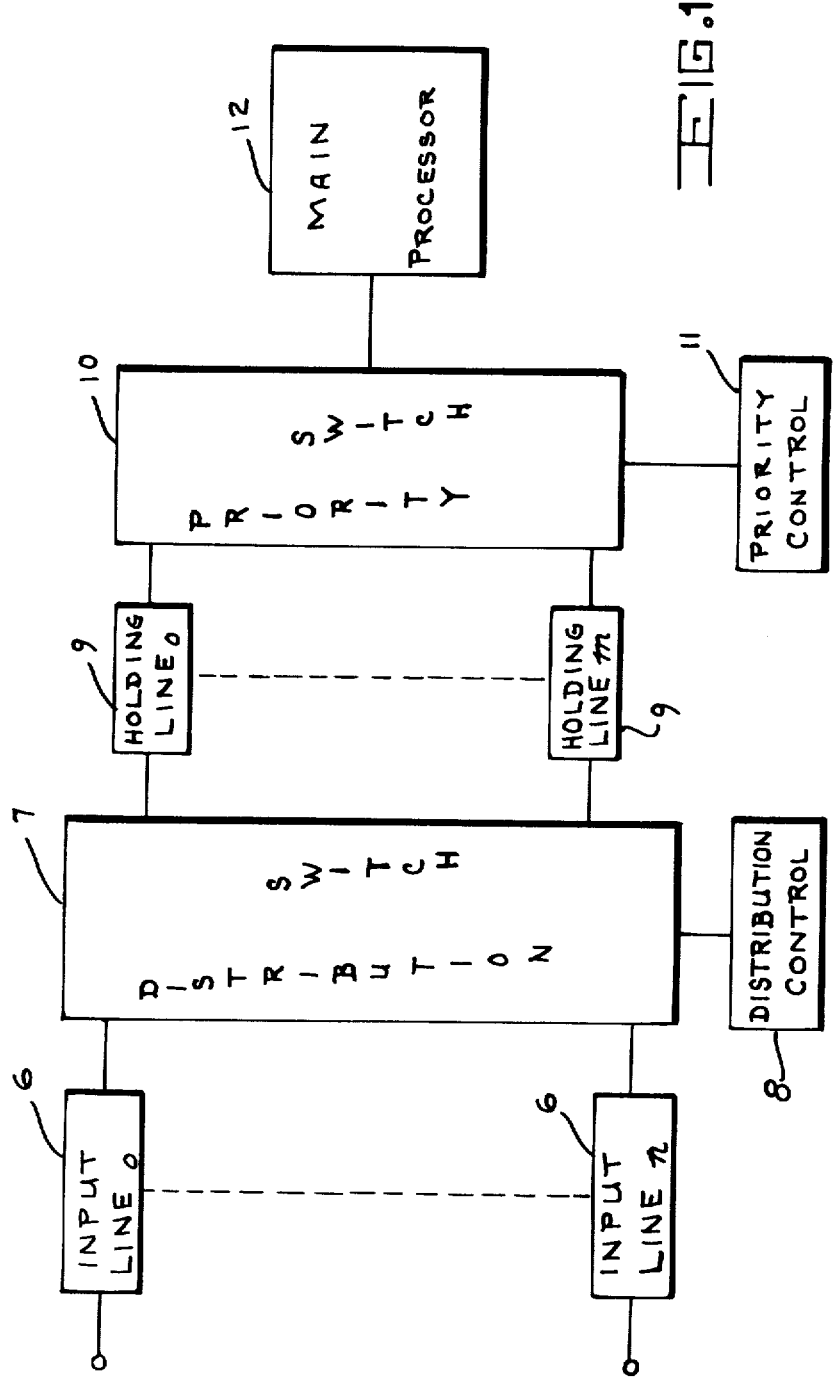
FIG. 1 is a block diagram of the random action event switch comprehended by the invention.

The random action event switch of the invention is illustrated in block diagram form by FIG. 1 and comprises input lines 6, distribution switch 7, holding lines 9, priority switch 10, priority control 11 and main processor 12.

Upon arrival of an event on one of the $n$ input lines 6, it is conditioned for the system and switched into one of $m$ holding lines 9. Whenever the main processor 12 has finished the last event, it reads out the holding line next in line according to the priority of the arrival of the event it holds. The processed event (time of occurrence and identity) is sent to a computer or similar device for eventual recording on magnetic tape.

Figure 2:
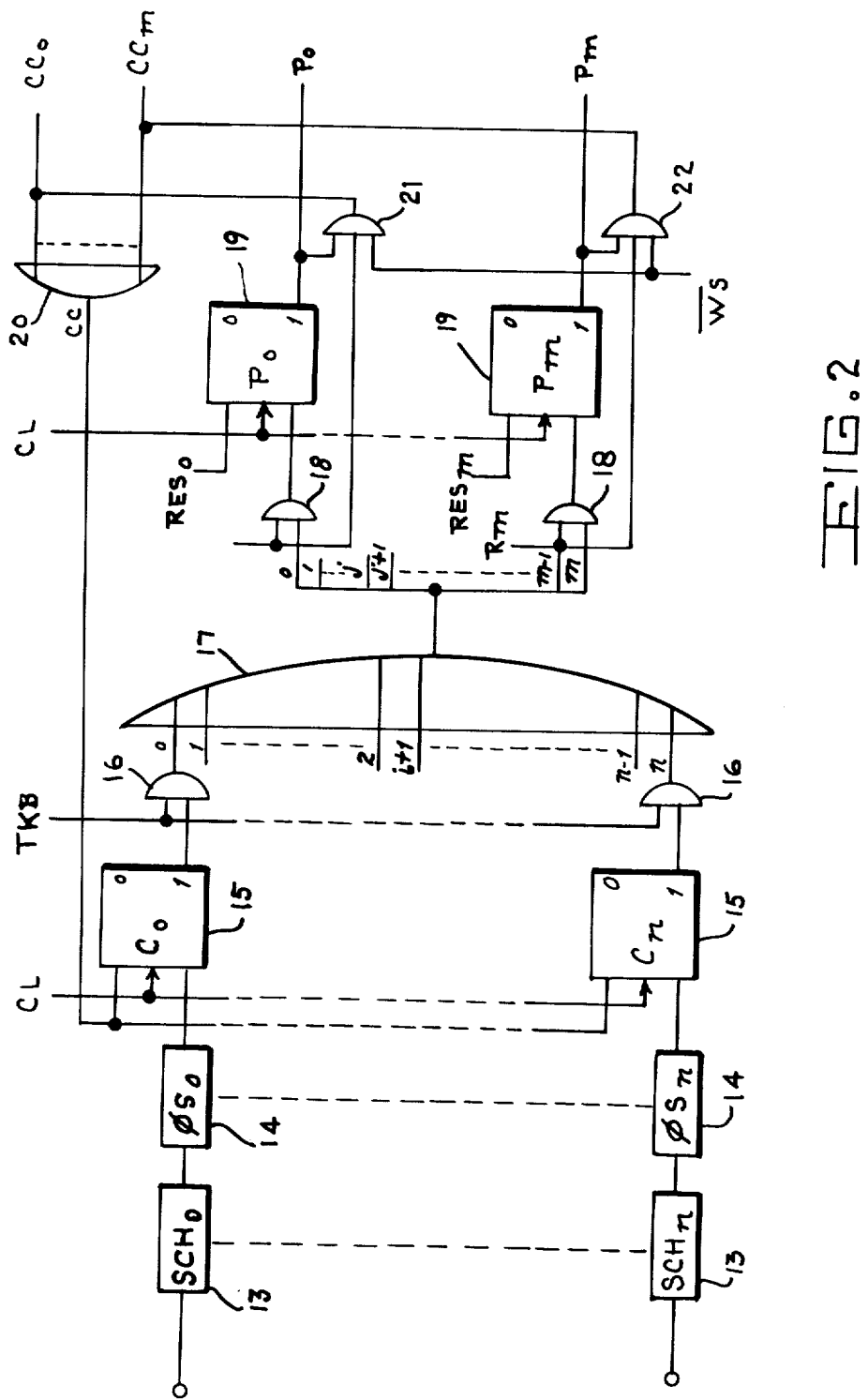
FIG. 2 is a schematic diagram of the input lines and distribution switch of the random action event switch of FIG. 1.
Figure 3:
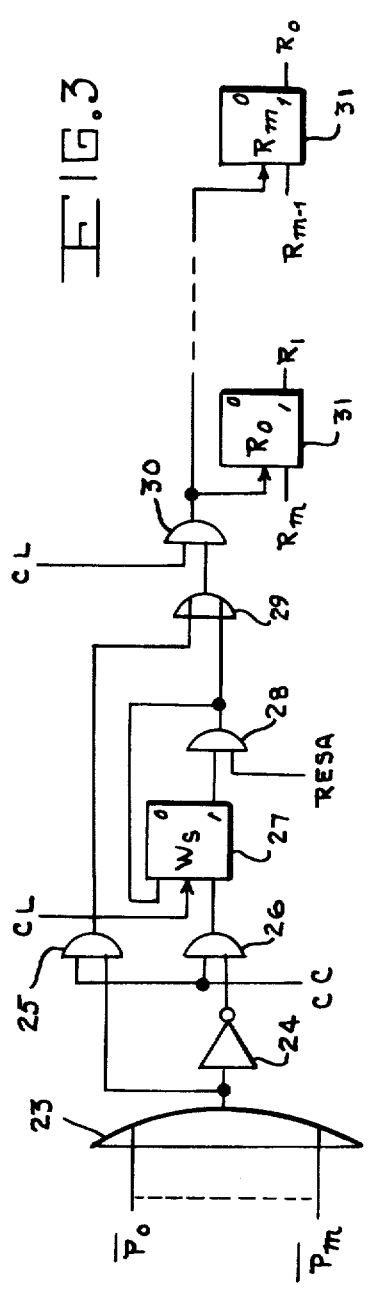
FIG. 3 is a schematic diagram of the distribution control circuit of the random action event switch of FIG. 1.

FIG. 2 is the detailed logic diagram of the input and the distribution switch. It consists of Schmitt trigger 13, single shot trigger 14, flip-flops 15 (designated $C_o$ through $C_n$), flip-flops 19 (designated $P_o$ through $P_n$) and AND gates 16, 17, 18, 20, 21 and 22. The event, usually the crossing of a threshold voltage by the signal waveform, is detected by Schmitt-trigger 13, pulsed by single shot trigger 14, and synchronized to the system clock CL by the flip-flops 15. The C flip-flops 15 also serves as a temporary buffer for the event until the switch action is completed. CL has a higher rate than the timing clock TKB, approximately by an order of magnitude. Events are accumulated for switching during a TKB period and then transferred to the holding line P flip-flop 19. Which P flip-flop out of the $m$ possible will be selected is determined by the distribution control (FIG. 3) and selected by the R term on the AND gate 18 ahead of P flip-flop 19. As soon as a holding line has been committed (and only one is being committed at any one TKB clock time) the term CC is generated which a. transfers the identities of the accumulated events into a buffer (FIG. 4);
b. releases the input lines for acceptance of another event (by resetting the C flip-flops, and
c. triggers the control to make the next free holding line available.

WS is an overflow condition that operates when too few holding lines are installed. The H term together with TKB controls the operation of the holding line. The synchronization of the inputs to CL and the accumulation of events during one TKB period assures that no events can get lost.

The distribution control (FIG. 3) is a very simple ring-counter that is shifted one stage on each term CC. It comprises AND gates 23, 25, 26, 28, 29, 30, inverter gate 24, flip-flop 27 and flip-flop 31 (designated $R_o$ through $R_m$). Shifting is accomplished during a TKB period so that the next holding line is available at the next TKB pulse. If the number of holding lines is too small for a particular accumulation of inputs, WS flip-flop 27 will be set which stops any advance of the ring counter because there are no more holding lines available and inhibits the term CC. This has to be done in order not to reset the C flip-flop during WS time so that the "overflow" events can be counted.

FIG. 4 shows the logic diagram of a possible version of a holding line. This comprises counter 32 (designated counter $o$ through counter $m$), flip-flops 33 (designated $E_{oo}$ through $E_{on}$), flip-flops 34 (designated $E_{mo}$ through $E_{mn}$), read-out gates 35, and gates 36, 37, 38, and OR gate 39. The event triggers an auxiliary counter which counts with TKB for the time it takes until this line can be attended to. At this point, the main TKB counter (not shown) is read out and the auxiliary counter is stopped and also read out. These two values are subtracted in the main processor 12 which yields the precise time of occurrence of the events.

Figure 5:
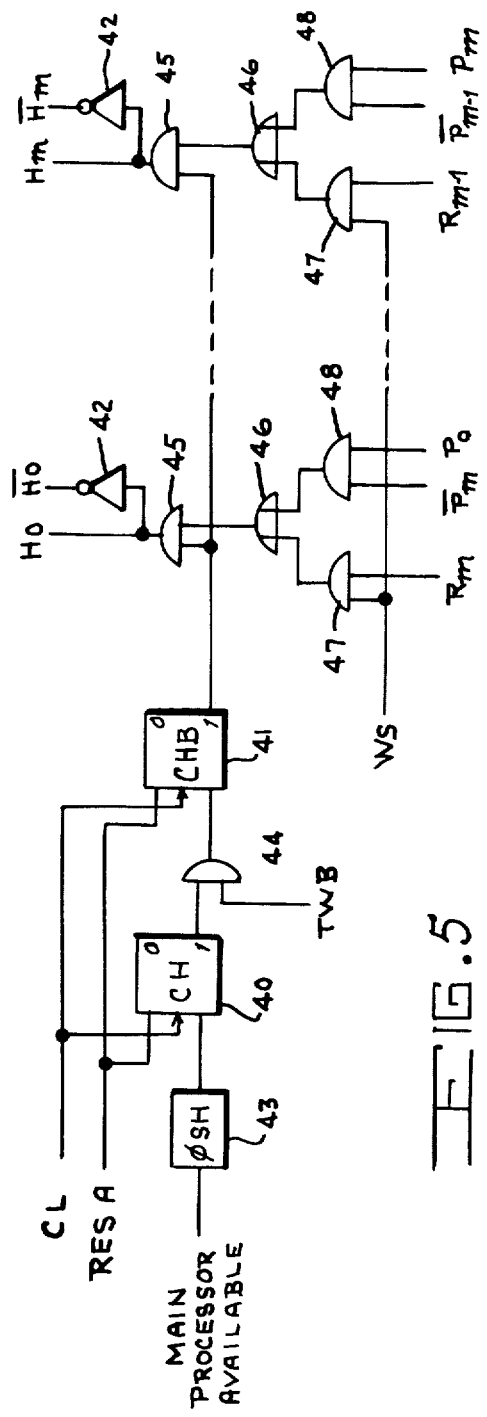
FIG. 5 is a schematic diagram of the priority control circuit of the random action event switch of FIG. 1.

The identity buffer has as many cells as there are input lines. Read-out of the holding line is accomplished by the term H. This term is explained in FIG. 5, the logic diagram for the priority selector. Referring to FIG. 5, the priority selector circuit consists of single shot trigger 43, flip-flops 40, 41, inverter gates 42, and gates 44, 45, 46, 47, 48. The main processor 12 sends a signal indicating that it is available. This signal is synchronized to TKB clock in the usual manner and triggers the action according to the priority developed by the R and P terms. WS again appears here to avoid any confusion in case all holding lines are committed. The basic strategy here is to observe the status of the P flip-flop 19. The combination of $P(i-1)P(i)$ always locks on to the holding line which has the oldest (in terms of arrival) information and this generates the corresponding $H(i)$ term.

The various RES terms are reset commands which are shown here for completeness. Their timing depends largely on the system used for the main processor. Again the H terms are used to select from the general reset command RESA the line reset RESO . . . RESM for the respective holding line $m$.

The random action event switch of the invention is effective to accomplish all of the objects set forth above. It also exhibits various other new and important features. For example, the switch transfers information from multiple n inputs into multiple $m$ outputs ($m<n$, $m$ unrelated to $n$). Switch action is random, i.e., no sequence or program is employed, and any input can be switched into any output as soon as an input arrives. Events stored in the holding lines are processed in exactly the same priority as they arrived regardless of the inputs they came from or of the holding lines they were switched into. The switch always has a holding line waiting for any input that may arrive. It does not scan the inputs to detect an arrival and it does not search the outputs to find one that is available. Switch action does not occupy a time period because it happens within the resolution unit of the time clock of the system. Switch action is possible at every time clock pulse for any input without restriction. Events arriving during the same clock period are accumulated and switched together into one holding line while still preserving their identity. Furthermore, the switch solves the "lock-out" problem. The biggest problem in the measurement, on the same time scale, of the time of occurrence of multiple events, is the lock-out of event, i.e., events do get lost when only a single processing device is available because of the time it takes for processing. Even with several holding lines that are permanently attached to corresponding input lines, events on the same input line may get lost when they are closely spaced because of the time it takes to attend to the corresponding holding line.

The switch also makes it possible to make the number of outputs ($m$) smaller than the number of inputs ($n$), and therefore contributes to a cost reduction. $m$ is solely dependent on the probabilities of the occurrence of events. In addition, the switch allows immediate response of the data processing sub-system because it is not fed to a time consuming computer program and to the availability of the computer.

While the invention has been described in one presently preferred embodiment, it is understood that the words which have been used are words of description rather than words of limitation and that changes within the purview of the appended claims may be made without departing from the scope and spirit of the invention in its broader aspects.

What is claimed is:

1. In a data processing system having a main processor, a systems clock, a timing clock, and $n$ inputs, $n$ being an integer greater than one, the improvement comprising a random action event switching circuit, said random action event switching circuit including
    a timing clock having a period longer than the period of said systems clock,
    an input line connected to each system input, each said input line including means for detecting, retaining, and synchronizing with said system clock, events received thereon,
    $m$ holding lines, $m$ being an integer less than $n$, each said holding line having means for retaining the identity of the events accumulated on said input lines during one timing clock period,
    a logic circuit for providing access to an available holding line and, at the end of each time clock period for clearing the input lines and switching the events accumulated thereon to said available holding line, and
    a priority selector circuit for switching to said main processor for read-out the holding line next in line according to the priority of arrival of its retained events, said priority selection circuit being responsive to availability condition signals from said main processor.

2. The random action event switching circuit defined in claim 1 wherein said timing clock has a period that is approximately an order of magnitude greater than the period of said system clock.

3. The random action event switching circuit defined in claim 1 wherein
    each input line comprises a Schmitt trigger connected to receive signals from a given system input, a single shot trigger connected to pulse each output signal of said Schmitt trigger, an input line flip-flop actuated by the output of said single shot trigger and signals from said timing clock, and an and gate for summing the output of said input line flip-flop and signals from said systems clock, and
    each said holding line comprises a holding line flip-flop actuated by the outputs of the input lines and signals from said timing clock, an and gate for summing the output of said holding line flip-flop, system holding line read-out signals and signals from said systems clock, counter means responsive to the output of said and gate and signals from said timing clock, and read-out gate means connected to the output of said counter means and responsive to system read-out signals, said read-out gate means being connected to deliver signals to said main processor.

4. The method of processing all of the received events in time sequence of arrival of a data processing system having a main processor and $n$ inputs, $n$ being an integer greater than one, comprising the steps of
    detecting on $n$ input lines events received from corresponding system inputs and retaining said events in time sequence of arrival on holding lines for discrete time intervals, said time intervals being longer than the timing clock period,
    at the end of each discrete timing clock period, switching to one of $m$ events holding lines, $m$ being an integer less than $n$, the events accumulated on said input lines during that time interval preserving the identities of said events, and
    switching the event holding line containing the oldest events in time of arrival to the input of the data processing system main processor for read-out in response to a main processor availability signal.

5. The method of processing events defined in claim 4 wherein said discrete time intervals are several orders of magnitude greater than the timing clock period.

* * * * *